United States Patent
Scahill et al.

(10) Patent No.: US 10,111,159 B2
(45) Date of Patent: Oct. 23, 2018

(54) ACCESS POINT DETECTION

(71) Applicant: BRITISH TELECOMMUNICATIONS PUBLIC LIMITED COMPANY, London (GB)

(72) Inventors: Francis James Scahill, London (GB); Richard Joseph Evenden, London (GB); Barbara Orlandi, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 14/389,628

(22) PCT Filed: Mar. 27, 2013

(86) PCT No.: PCT/GB2013/000140
§ 371 (c)(1),
(2) Date: Sep. 30, 2014

(87) PCT Pub. No.: WO2013/144548
PCT Pub. Date: Oct. 3, 2013

(65) Prior Publication Data
US 2015/0063331 A1    Mar. 5, 2015

(30) Foreign Application Priority Data

Mar. 30, 2012 (EP) ..................................... 12250086

(51) Int. Cl.
*H04W 48/16* (2009.01)
*H04W 48/20* (2009.01)
(Continued)

(52) U.S. Cl.
CPC ......... *H04W 48/16* (2013.01); *H04L 63/0892* (2013.01); *H04W 12/06* (2013.01); *H04W 48/20* (2013.01); *H04W 88/06* (2013.01)

(58) Field of Classification Search
CPC ...... H04W 48/04; H04W 72/02; H04W 48/16
(Continued)

(56) References Cited

U.S. PATENT DOCUMENTS 8,055,248 B2 * 11/2011 Hicks, III ......... H04M 3/42246
455/415
2001/0046223 A1   11/2001 Malki et al.
(Continued)

FOREIGN PATENT DOCUMENTS

WO   WO 2008/124612   10/2008
WO   WO 2011/119699    9/2011

OTHER PUBLICATIONS

Research In Motion UK Ltd: ANDSF applicability to I-WLAN Mobility, 3GPP Draft, C1-111879-24234-A10, $3^{rd}$ Generation Partnership Project (3GPP), Mobile Competence Centre, vol. CT WG1, No. Tallinn, May 9, 2011, May 2011 (11 pages).
(Continued)

*Primary Examiner* — Benjamin Lamont
*Assistant Examiner* — Nizam U Ahmed
(74) *Attorney, Agent, or Firm* — Nixon & Vanderhye P.C.

(57) ABSTRACT

A wireless communications device has network interfaces for accessing cellular data networks and Wi-Fi wireless local area networks. Wi-Fi offload allows data traffic to be moved away from the cellular network to the Wi-Fi network. To avoid any existing data sessions being broken during offload, Proxy Mobile IP (PMIP) must be supported by a Wi-Fi access point and associated Mobile Access Gateway. Before Wi-Fi association and authentication, the wireless communication device scans the surrounding area for access points and determines which of the access points supports PMIP before selecting one for association.

12 Claims, 12 Drawing Sheets

(51) Int. Cl.
*H04W 12/06* (2009.01)
*H04W 88/06* (2009.01)
*H04L 29/06* (2006.01)

(58) Field of Classification Search
USPC .......................................................... 370/338
See application file for complete search history.

(56) References Cited

U.S. PATENT DOCUMENTS

| | | |
|---|---|---|
| 2004/0066757 A1 | 4/2004 | Molteni et al. |
| 2004/0165548 A1* | 8/2004 | Backes ................. H04L 47/125 370/328 |
| 2008/0225807 A1 | 9/2008 | Patil |
| 2008/0304434 A1* | 12/2008 | Giaretta .............. H04W 60/005 370/313 |
| 2010/0074179 A1* | 3/2010 | Akiyoshi .............. H04L 63/164 370/328 |
| 2010/0103876 A1 | 4/2010 | Aso |
| 2011/0158208 A1* | 6/2011 | Solanki ................. H04L 12/185 370/338 |
| 2013/0083722 A1* | 4/2013 | Bhargava ............ H04W 72/085 370/315 |
| 2013/0091212 A1* | 4/2013 | Rajakarunanayake ...................... H04L 51/32 709/204 |
| 2013/0308527 A1* | 11/2013 | Chin ................. H04W 36/0022 370/328 |
| 2014/0321328 A1* | 10/2014 | Zuniga .................... H04W 8/06 370/254 |

OTHER PUBLICATIONS

Larsson, C. et al., "Simultaneous Multi-Access and Flow Mobility Support for PMIPv6", NetExt Working Group, Internet-Draft, Mar. 4, 2009 (48 pgs.).
International Search Report for PCT/GB2013/000140 dated Sep. 4, 2013.

* cited by examiner

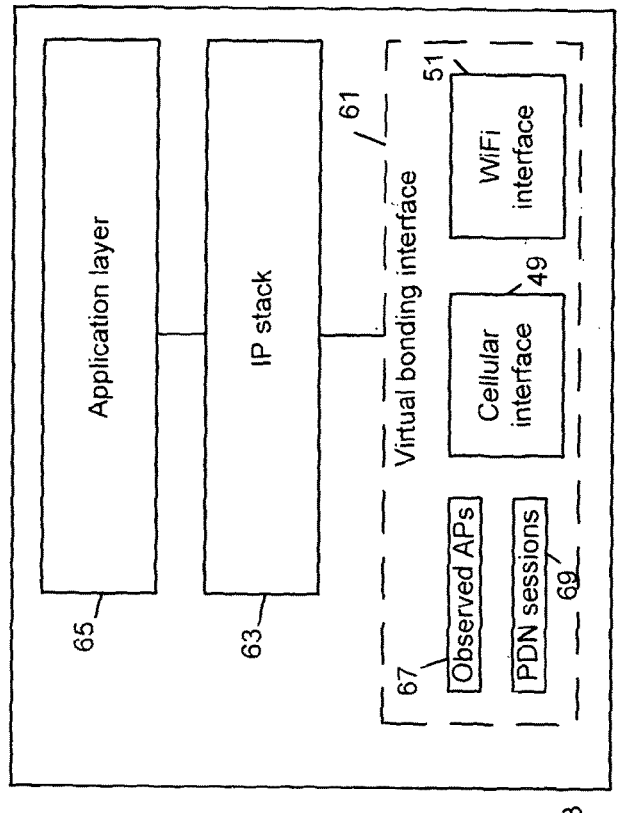
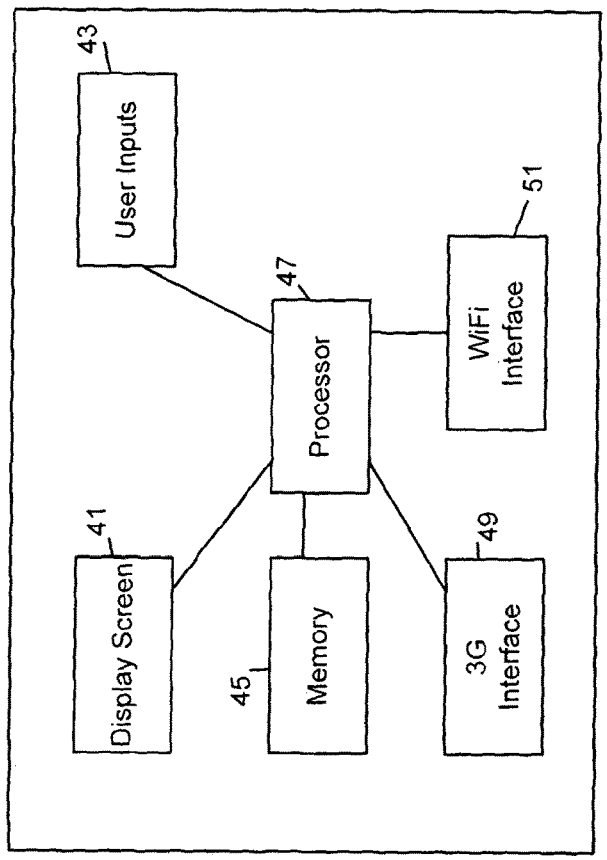

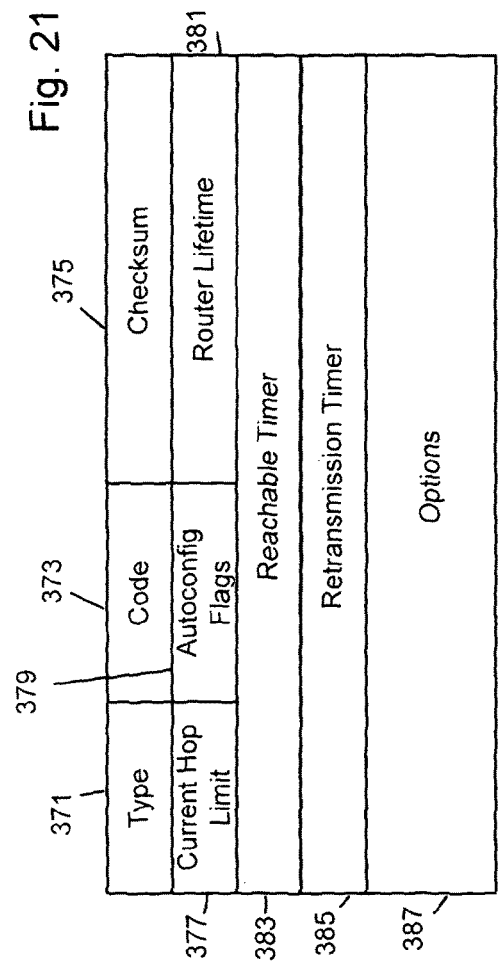
Fig. 21
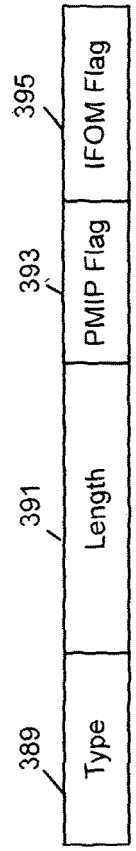
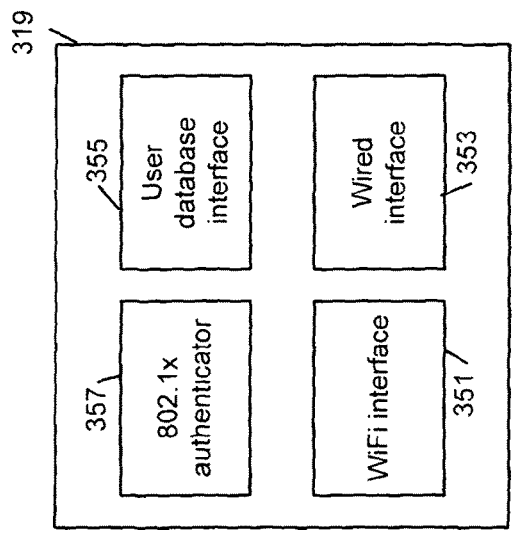
Fig. 19
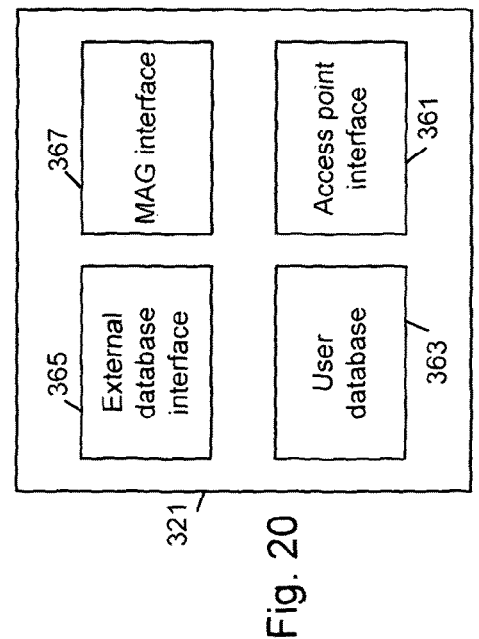
Fig. 22
Fig. 20

ACCESS POINT DETECTION

This application is the U.S. national phase of International Application No. PCT/GB2013/000140 filed 27 Mar. 2013 which designated the U.S. and claims priority to EP 12250086.1 filed 30 Mar. 2012, the entire contents of each of which are hereby incorporated by reference.

The present invention relates to Wi-Fi devices and in particular to a method of determining whether an access point can provide network mobility services.

INTRODUCTION

In recent years, many mobile devices such as smartphones and tablet computers have included radio transceivers for cellular mobile data access and wireless LAN Wi-Fi capabilities. At the same time, conventional laptop computers can now be fitted with cellular network adaptors in the form of Subscriber Information Modules (SIM) card slots or Wireless Wide Area Network (WWAN) cards. Access to the cellular radio network supplements the conventional Ethernet wired and Wi-Fi wireless data connections in order to provide users with wider access to remote network services and resources such as the Internet.

With a large customer base, providing reliable and fast cellular data access to each device using 3G and 4G technologies is expensive for network operators because the working spectrum licenses are expensive. In contrast, Wi-Fi access technology is not regulated and can often support higher data rates at the expense of a shorter working range. It is therefore desirable to utilise the cheaper and faster option as much as possible in order to offload traffic from the cellular network.

Various Wi-Fi offload schemes have been proposed to allow a mobile device to shift data traffic from the cellular access network to the Wi-Fi access network.

In the simplest case, the mobile devices contain the functionality to allow a user to manually switch data connections. Generally the user keeps the cellular data connection on and only turns on Wi-Fi when they within range of a known Wi-Fi network such as when they are at home or work. Alternatively, both the cellular and Wi-Fi interfaces are always enabled and the mobile device is configured to periodically poll the surrounding area for known Wi-Fi networks. If none are in range, the cellular data connection is used; otherwise the mobile device connects to the known WLAN.

Changing network interfaces will result in existing data sessions being terminated, due to the consequential change in IP address. For small data transfers such as retrieving emails this will not result in a noticeable loss of service, however, this is not true for operations such as large file transfers or streaming applications.

3GPP standard TS23.402 describes how Wi-Fi networks may be integrated with 3GPP based cellular networks to enable more seamless handover between the cellular and Wi-Fi networks.

Each interface between the various components in the architecture is given a specific label and defines the properties that the components must support in order to be compliant with the interface. An example of a Trusted non-3GPP access network is a public Wi-Fi hotspot network such as BT Openzone that conforms to the S2a and STa interfaces. This public Wi-Fi network will consist of multiple Wi-Fi access points located in various geographical locations. The cellular operators may have agreements with multiple Wi-Fi operators to extend the range of Wi-Fi devices available for Wi-Fi offload. Depending on the terms of the agreements, some of the networks will be trusted while others will be untrusted and must be compliant with different interfaces.

The purpose of this architecture is to allow data traffic over non-3GPP access networks, such as Wi-Fi, to be routed via a 3GPP core network to enable standardised behaviour in the treatment of data transport, for example, common QoS policies, billing and charging to be applied.

Furthermore, the architecture enables IP session continuity to be provided when a mobile device hands over from a cellular access network to a non-3GPP access network such as Wi-Fi or vice versa, since all user data is routed via the PDN-GW (via S2a) which can then act as an anchor point for the IP session.

IP Session mobility allows a device to move its IP connections from one access network to another transparently so that applications are unaware of the change in access network. Trusted non-3GPP access network can support such IP mobility using either Network Based mobility mechanisms e.g. Proxy Mobile IP (PMIP) over the S2a interface or host based mobility schemes such as Dual Stack Mobile IP (MIP) over the S2c interface. S2a based Network based mobility schemes depend upon functionality within the non-3GPP access networks PMIP is an adaptation of MIP that removes the need for the mobile device to support the MIP protocol in order to be able to maintain IP connections when changing access network. In PMIP a proxy entity in the access network (the Mobile Access Gateway (MAG)) takes responsibility for performing the standard Mobile IP Binding Updates to the Local Mobility Anchor (LMA) on behalf of the mobile device. In the case of 3GPP networks the LMA function is typically provided by the PDN-GW. The PMIP MAG also takes care of tunnelling the traffic across the network to the PDN-GW via S2a. The MAG is usually the access router for the mobile device, i.e. the first hop router. There may be multiple MAGs within a particular access network.

The LMA is the globally routable anchor point for the IP address issued to the mobile device and maintains the Binding Cache (a collection of routes) for individual mobile devices. The routes point to MAGs managing the access links to which the mobile devices are currently attached. Packets for a mobile device are routed to and from the mobile device through tunnels between the LMA and the MAG to which the device is attached. The LMA is also responsible for assigning IPv6 prefixes to terminals (e.g., it is the topological anchor point for the prefixes assigned to the MN). There may be more than one LMA in an LMD.

Once a mobile device attaches to an access link, the MAG in that access link, after identifying the mobile device, performs mobility signalling on behalf of the mobile node. The MAG sends to the LMA a Proxy Binding Update (PBU) associating its own address with the mobile device's identity (e.g., its MAC address or an ID related with its authentication in the network). Upon receiving this request, the LMA assigns an IPv6 prefix—called Home Network Prefix (HNP)—to the mobile device. Then, the LMA sends to the MAG a Proxy Binding Acknowledgement (PBA) including the prefix assigned to the mobile device. The mobile device is then able to configure one or more IPv6 addresses from the assigned prefix. The LMA also creates a Binding Cache Entry (BCE) and establishes a bi-directional tunnel to the MAG (the IP address of the end-point of this tunnel on the MAG side is called the Proxy Care-of Address-Proxy CoA). Whenever the mobile device moves, the new MAG updates the mobile device's location in the LMA, advertises the same prefix to the mobile device (through unicast Router Advertisement messages) and shows the same layer-2 and layer-3 identifiers to the mobile device, thereby making the IP mobility transparent to the mobile device.

IP Flow Mobility (IFOM) is an extension to PMIP that allows a terminal to be connected to multiple access networks at the same time with the same IP addresses and with the LMA controlling which IP flows (defined by the n-tuple source address, source port, destination address, destination port, IP protocol) are directed via each access network.

For the uplink traffic routing, there are potentially several different approaches that the mobile device may follow. For example, the decision can be taken by the mobile device itself, selecting which access network to use independently of the LMA, although this could lead to asymmetric routing in the uplink-downlink paths. Alternatively the mobile device can send uplink traffic using the same access network that is receiving downlink packets belonging to the same flow. Following this approach, the MN copies the decisions made by the LMA for the downlink traffic when sending uplink traffic, thereby enabling the MN to follow any changes that the LMA may perform during a flow lifetime.

This means that for traffic initiated by the MN, it will initially be sent on one interface by default. This interface may be determined either by a static policy or by a policy received from a network function such as the ANDSF. Then depending on which interface the corresponding DL packets arrive, the UL packets will either remain on the same interface or be moved.

In the PMIP and IEOM protocols the MAGs handle device mobility and in particular to recognise when a new device has moved to a new location or access network and to inform the LMA of the changes. Once this change has been registered, new data sessions are sent to the new MAG in order to reach the mobile device at its new location. More importantly, data packets relating to existing data sessions are redirected to the new MAG to reach the mobile device. In this way there is no interruption of service experienced by the user. However, if the mobile device connects to an access point which does not support PMIP then there will be disruption to the service. This may occur because the only available access point at the new location does not support PMIP, or where there are multiple access points available, the mobile devices bases its connection decision on the observed signal strengths of the access point.

It is therefore important that when a mobile device moves location, it should connect to an Access Point/MAG which is capable of supporting PMIP if one is available.

A Wi-Fi network operator wishing to provide a 3GPP compliant Wi-Fi-offload service using a network-based PMIP and/or IP Flow Mobility solution to migrate connections (and/or individual IP flows) between Wi-Fi access networks and 3GPP access networks would need to connect those Wi-Fi access points to a gateway (a MAG in the case of PMIP-based IFOM). However, in a network including thousands of access points sharing the same SSID, the process of upgrading the network for providing that feature cannot be instantaneous, and may not be possible on all legacy access points. Therefore the Wi-Fi network will in practice consist of a mix of PMIP enabled and non-PMIP enabled access points. In addition IP Flow Mobility is an optional extension to PMIP which may not be supported on all PMIP enabled Access Points.

Even if a particular access point is capable of supporting PMIP and IP Flow Mobility then the Wi-Fi network operator may not want to offer such capabilities to all users, who connect to that access point. Support for such functionality may be restricted to certain groups of users for commercial reasons e.g. differential service price points. Alternatively in the case where a WLAN network operator is providing access to multiple Cellular Operators in parallel then each Cellular operator may have differing support for PMIP and or IFOM capabilities within their own core network and so PMIP functionality may only be offered to customers of a particular cellular operator.

In an area where there is overlapping coverage between PMIP enabled Access Points and legacy access points then ideally a user will want to connect to the PMIP enabled AP since this offers the potential for greater service functionality e.g. seamless handover between access points and between Wi-Fi and cellular. The connection manager on the device would ideally like to know which of the available access points can support network mobility functions such as PMIP and IFOM before it connects so that it can select the best access point. Even where support for PMIP and IFOM cannot be determined before connection, whether the currently connected access point supports PMIP and network-based flow mobility will enable the terminal to determine how it should route uplink IP packets when multiple networks are connected simultaneously.

When using PMIP (without flow mobility) the device must decide which interface to route outbound packets over. In order to maintain IP session continuity it must know whether a particular IP connection can be moved from one interface whilst maintaining session continuity before it decides to route outbound packets. Currently this decision is an implicit one based on whether the same IP address or network prefix is allocated to the device for the two independent access networks. However in break-before-make handovers only one network is ever connected at one time.

In addition where network based IFOM Flow Mobility is used (and where the outbound per flow packet routing is controlled based on the inbound packet arrival route) the same network prefix will be in use simultaneously on multiple interfaces however there is currently no explicit signalling between the UE and the network to indicate whether network based IFOM is enabled. If the device assumes IFOM is in use but it is not supported then it will never move any flows to the new interface since it will be waiting for an inbound packets on the new interface.

In both cases the determination of support of network mobility functions cannot be based on the broadcast SSID since this SSID is common to both PMIP and non-PMIP enabled access points. In addition in Wi-Fi networks the SSID is common to all users of a particular AP and so it is not possible to indicate per user support of PMIP/IFOM using the SSID.

In addition for a network where all traffic from the AP is tunnelled to a MAG then it is the MAG that performs the PMIP functionality and it is the MAG that decides whether PMIP functionality is enabled for that device or user. The AP thus may not know and indeed ideally would not need to know anything about PMIP and IFOM. In the case where dynamic MAG load balancing is applied or where Multiple MAGs are used per AP (i.e. in the case of a Wi-Fi operator supporting Wi-Fi offload for multiple MNOs on the same access network) then the AP may only support PMIP for some of its associated devices i.e. those that are routed to a particular PMIP enabled MAG.

Existing standards such as IEEE802.11, IEEE802.11u, and ANDSF etc. do not provide a means for a device to determine what network mobility features are supported, either before association or once connected.

Thus embodiments of the present invention relate to new mechanisms to enable a device to determine automatically the network mobility features supported by an access network either prior to connection or once the terminal has connected.

STATEMENTS OF INVENTION

In one aspect, the present invention provides a method of determining whether access points to a wireless communications network are capable of providing network mobility to data sessions, the method comprising a wireless communication device performing the steps of: detecting surrounding access points; and accessing network mobility data relating to the detected access points prior to connecting to one of the detected access points.

In another aspect, the present invention provides a wireless communications device for determining whether an access point in a wireless communications network is capable of providing network mobility to data sessions, comprising: means for connecting to the access point; and accessing means for accessing network mobility data relating to the access point.

In another aspect, the present invention provides a wireless communications device for determining whether access points to a wireless communications network are capable of providing network mobility to data sessions, comprising: means for detecting surrounding access points; and accessing means for accessing network mobility data relating to the detected access points prior to connecting to one of the detected access points.

DESCRIPTION OF FIGURES

Embodiments of the present invention will now be described with reference to the accompanying Figures in which:

FIG. 2 schematically shows the physical components of a mobile device illustrated in FIG. 1;

FIG. 3 schematically shows the functional components of the mobile device;

FIG. 19 schematically shows the functional components of an access point in the third embodiment;

FIG. 20 schematically shows the functional components of an AAA server in the third embodiment;

FIG. 21 shows the fields in a Router Advertisement message;

FIG. 22 shows the format of a PMIP capability option in the Router Advertisement message.

DESCRIPTION

First Embodiment

Figure 1:
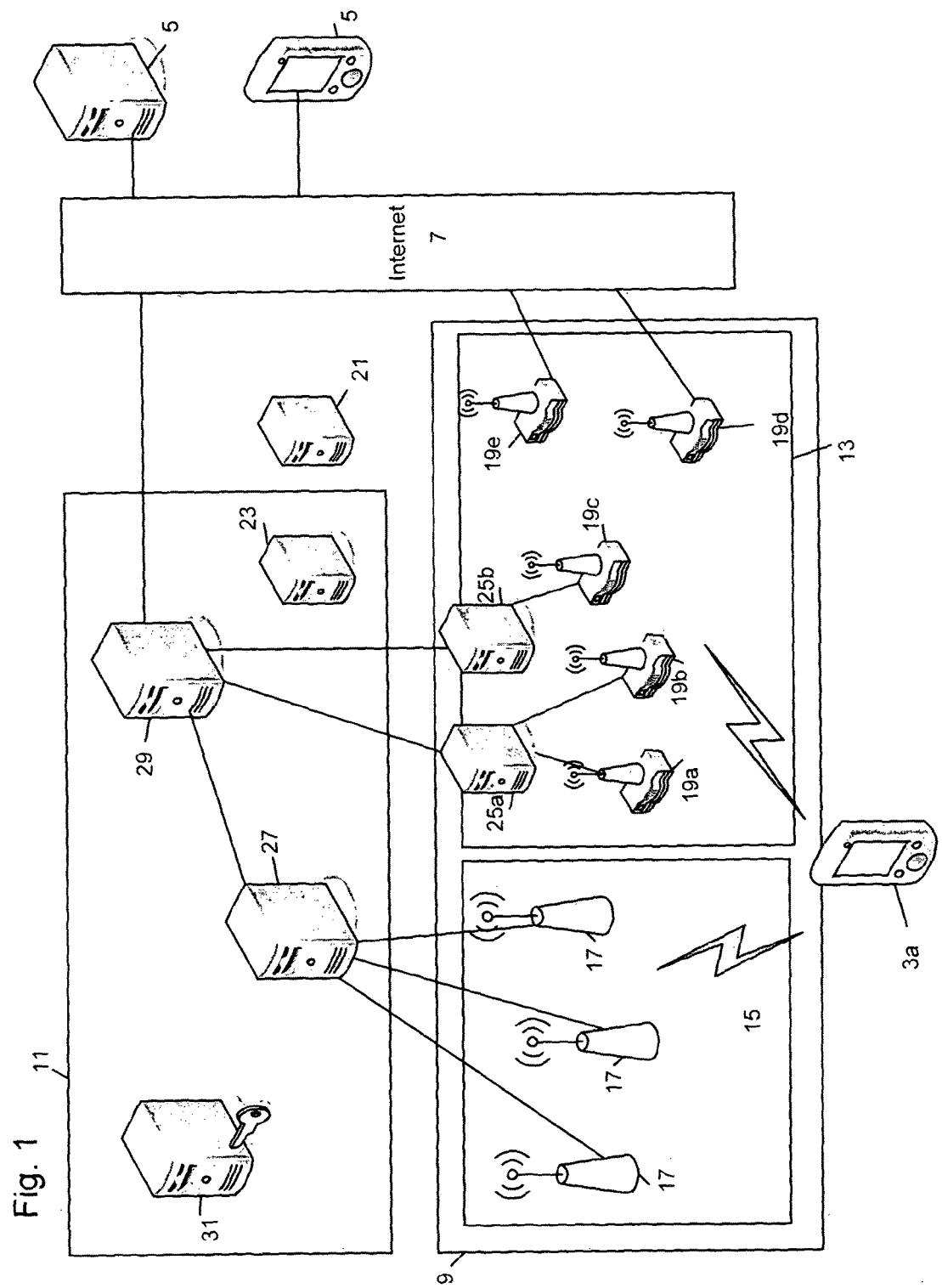
FIG. 1 shows an overview of a system architecture enabling mobile devices to determine mobile IP capability of access points according to a first embodiment.

FIG. 1 shows an example network 1 according to the first embodiment. In this network 1, mobile devices 3 can connect to a number of remote devices 5, such as application servers or other computing devices, located on a Wide Area Network (WAN) such as the Internet 7. The mobile devices 3 are not connected directly onto the Internet but instead data packets are routed via a radio access network (RAN) 9 and then via an Evolved Packet Core (EPC) 11 before the packets are transmitted via the Internet 7. In this case, there are two RANs based on different technologies: a Wi-Fi based hotspot network 13 such as BT Openzone and a cellular access network 15 conforming to the 3GPP Long Term Evolution (LTE) standards.

The cellular access network 15 contains a number of cellular base stations 17 located in different geographical locations and the network 15 provides data connectivity between the mobile device 3 and the EPC 11. In this embodiment, each cellular base station 17 is an Enhanced NodeB and provides the termination point for over the air data communication from the EPC 11 and addressed to the mobile devices 3 when connected.

The Wi-Fi hotspot network 13 is formed of a set of wireless access points 19, each creating a wireless local area network (WLAN) over a geographical area and having the same Service Set Identifier (SSID) of "BT Openzone" thereby allowing the mobile device 3 to roam across the Wi-Fi hotspot network 13.

The access points 19 use WPA2, IEEE 802.11i and/or IEEE 802.1x based Wi-Fi authentication to authenticate the user of the mobile device 3 onto the hotspot network 13. An Authentication, Authorisation and Accounting (AAA) server 21 provides authentication of the user either directly by referring to its own authentication database or after redirecting the request (proxy) to other AAA servers such as a Home Subscriber Server 23 within the EPC 11. The Wi-Fi hotspot network 13 connects to the EPC 11 via a number of Mobile Access Gateways (MAGs) 25 and different access points 19 may connect to the same or different MAGs 25.

As mentioned above, the cellular access network 15 and the Wi-Fi hotspot network 13 connect to the EPC 11 via a Serving Gateway (S-GW) 27 or Mobile Access Gateway (MAG) 25 respectively. These are in turn connected within the EPC 11 to a PDN-GW (which provides the PMIPv6

Local Mobility Anchor (LMA) function) 29 which links to the Internet 7 and remote devices 5. The function of the MAGs 25, S-GW 27 and LMA 29 to provide data connectivity and flow mobility are conventional and will not be described in more detail.

The EPC further includes an Access Network Discovery and Selection Function (ANDSF) server 31 which stores per user network selection policies and communicates these policies to mobile devices 3 using OMA Device Management protocols. The operation of this server 31 will be described in more detail later.

Returning to the Wi-Fi hotspot network 13, the hotspot network 13 does not impose strict hardware and software requirements on the wireless access points 19 and therefore different access points 19 can have different capabilities whilst still forming part of the hotspot network 13. For example, access point 19a is an advanced access point which supports IEEE 802.11a/b/g/n protocols whilst access point 19b is an older access point which only supports IEEE 802.11b/g.

The access points 19 can be connected to different MAGs 25 based on their geographic location. In FIG. 1, two access points 19a and 19b are connected to MAG 25a which supports PMIP and IFOM whilst a further access point 19c is connected to a different MAG 25b which does offer PMIP but only to a particular set of users. Two other access points 19d, 19e are configured to bypass the EPC 11 and are connected to the Internet 7 and so do not support PMIP. As mentioned earlier, all of the access points 19 are configured to use the same IEEE 802.11 Service Set Identifier (SSID) of "BT Openzone". PMIP supporting Access Points 19a, 19b, 19c, have a Point-to-Point connection to their respective MAGs 15 in the hotspot network 13, the MAGs 25 are responsible for implementing the PMIP functionality and so they are first hop router for the devices 3 connecting to PMIP enabled Access Points 19a-19c.

The aim of PMIP is to enable a mobile device 3 to maintain an existing data session even when the actual connection to the EPC 11 changes. One example is where the mobile device 3 connects to a different cellular base station 17 within the cellular data network 15, or when the mobile device 3 connects to a different Wi-Fi access point 19 in the Wi-Fi hotspot network 13. In both cases this is typically caused when the mobile device 3 moves to a new location which is outside the range of the current base station 17 or access point 19. Another reason may be a loss of power at the currently connected base station 17 or access point 19.

Furthermore, the mobile device 3 can be configured to use Wi-Fi data network 13 in preference to the cellular network 15. Such Wi-Fi Offload techniques allow the usage load on the cellular access network 15 to be reduced and therefore many mobile devices 3 are configured to use Wi-Fi networks 13, where it is available, in preference to cellular networks 15 for data communication.

The change to a new access point 19 will disrupt any existing data sessions since the mobile device's 3 IP address will change. To overcome this, in PMIP the LMA 29 and MAGs 25 or the S-GW 27 use care-of-addresses and tunnelling to ensure that the mobile device 3 is seen to maintain a consistent IP address for communication with to remote devices 5.

Therefore it is important that the mobile device 3 is connected to an access point 19 which is assigned to a PMIP enabled MAG 25 for the duration of the data session, even when it is changing location. The SSID of an access point 19 is not a definite indicator of PMIP capability, and in the case of hotspot networks, the access points 19 all broadcast the same SSID. Therefore the mobile device 3 must obtain specific capability information from the observed access points 19 in order to select one for connection.

If the access point does not support IFOM, then the data session will not be able to continue and the old data session will be lost. To overcome this problem, in the first embodiment, the mobile device 3 is configured to determine the capabilities of each observed access point 19 and in particular whether they support PMIP and IFOM and the user of the device 3 is allowed to use PMIP capabilities within the network 1. The mobile device 3 then connects to a suitable access point 19 on the basis of the determined information.

Mobile Device

FIG. 2 shows the components of the mobile device 3 in accordance with a first embodiment. As is conventional, the mobile device 3 contains a screen 41, a user input controller 43, working memory 45 and a central processor 47. In order to provide data connectivity, the mobile device also includes a cellular packet network interface 49, in this case a LTE interface, and an 802.11b/g/n Wi-Fi interface 51.

When computer program instructions stored in the memory 45 are executed by the processor 47 in accordance with the first embodiment, the mobile device can be regarded as a set of functional units.

FIG. 3 shows a functional view of the mobile device 3. To determine PMIP support on the mobile device, a virtual bonding interface 61 encapsulates both the cellular network interfaces 49 and the Wi-Fi interface 51 from upper IP stack layers such as an IP layer 63 and an application layer 65.

When applications in the application layer 65 communicate with remote applications running on remote devices 5, the data is converted into packets at the IP layer 63 for transmission on one of the cellular and Wi-Fi network interfaces 39, 41, and any data received from either of the network interfaces 39, 41 is processed and forwarded to the IP layer 63 for reassembly into a form suitable for applications to process in the application layer 65. The virtual bonding interface 61 is responsible for controlling the network interfaces 49, 51 so that the IP layer 63 does not need to have knowledge of which interface 49, 51 is being used to carry data packets to the remote devices S.

To achieve this effect, the virtual bonding interface 61 bonds the cellular and Wi-Fi network interfaces 49, 51 together into a single virtual network interface which maintains the same IP address regardless of the particular interface 49, 51 which is in use. The virtual bonding interface 61 also maintains a list of observed access points in a first store 67 and a list of current PON sessions on the cellular network interface 49 in a second store 69. As will be explained later, when the mobile device 3 is communicating with remote devices 5 using the cellular access network 15, i.e. using cellular network interface 49, and Wi-Fi offload may be possible, the virtual bonding interface 61 includes the standard functions of a connection manager and is responsible for determining whether any surrounding Wi-Fi access, point 19 supports PMIP and IFOM functionality and if possible, connecting to an enabled access point 19.

ANDSF

In the first embodiment, for Wi-Fi offload, the virtual bonding interface 61 of the mobile device 3 determines whether the surrounding access points 19 can support PMIP and IFOM by interrogating the Access Network Discovery and Selection Function (ANDSF) server 31.

The ANDSF server 31 is located within the EPC 11 network and contains information related to registered non-3GPP access networks, such as the Wi-Fi hotspot network 15, which can be used for data communications by mobile devices in addition to the 3GPP cellular access network 17.

Figure 4:
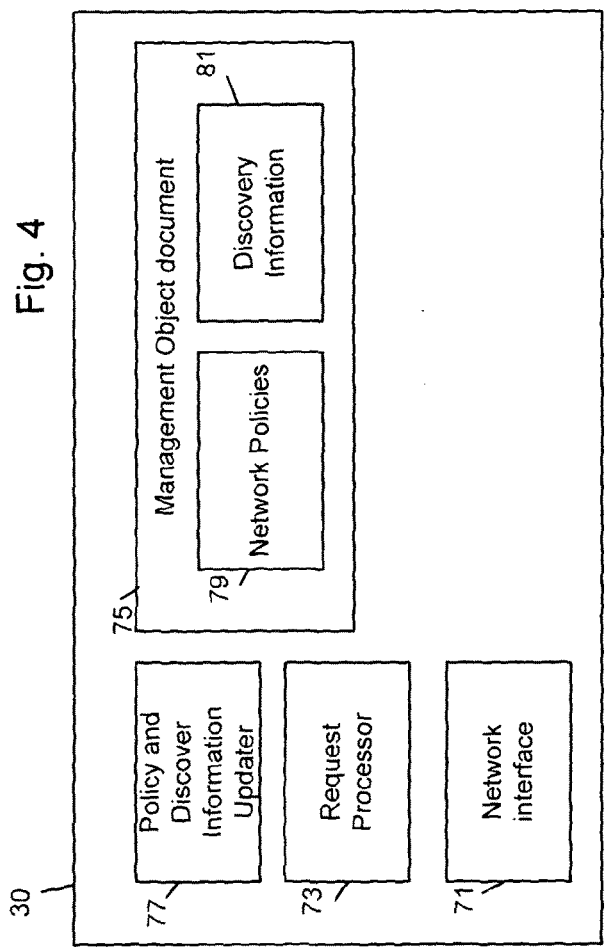
FIG. 4 schematically shows the functional components of the ANDSF server illustrated in FIG. 1.

FIG. 4 shows the functional components of the ANDSF server 31. The ANDSF server 30 contains a network interface 51, a request processor 53, a Management Object (MO) document 55 and a MO updater 57.

The ANDSF server 30 stores per user network selection policies and communicates these policies to end user terminals using OMA Device Management protocols. As shown in FIG. 4, network selection information is represented by the ANDSF Management Object described in 3GPP TS 24.312; it is an eXtensible Markup Language (XML) document 55 which is compatible with existing OMA-DM standards. ANDSF allows for multiple ANDSF servers to be present in a system with for example a Cellular Operator and Wi-Fi Operator maintaining separate ANDSF servers within their respective networks and a client device able to retrieve ANDSF MOs from both servers. In this embodiment, there is a single ANDSF server 31 located in the EPC 11 but maintained by both the cellular operator and the Wi-Fi hotspot operator.

The ANDSF MO document 75 specifies
1. Mobility Policies 79; and
2. Discovery Information 81.

Figure 5:
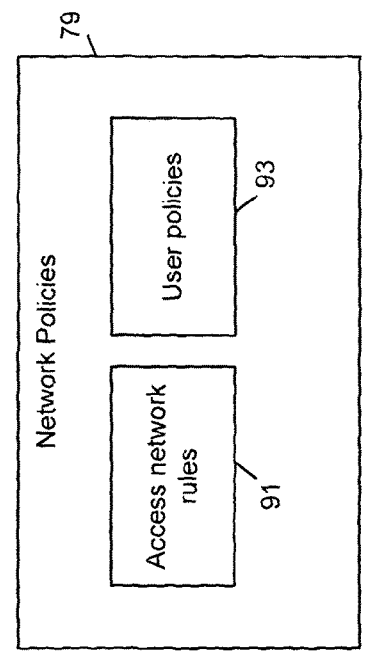
FIG. 5 shows the components of a network policy illustrated in FIG. 4.

As shown in FIG. 5, mobility policies 79 consist of a number of prioritised rules 91 that control which access network 13, 15, a device 3 should use. Each rule contains a validity condition e.g. location, time-of-day etc., for which that particular access network 13, 15 can be used. For example, a particular Wi-Fi access network 13, 15 can be marked as valid when the mobile device 3 is in a particular 3G cell between 9 am and 5 pm. Mobility policies 79 may also contain user specific rules 93 specifying whether the user is allowed to access the various networks as a result of arrangements between the cellular operators and the Wi-Fi operators.

The Discovery information 61 in the MO document 75 allows the ANDSF server 31 to describe which individual access points 19 are in a particular location. Furthermore, it contains information regarding the capabilities of each individual access point 19.

Figure 6:
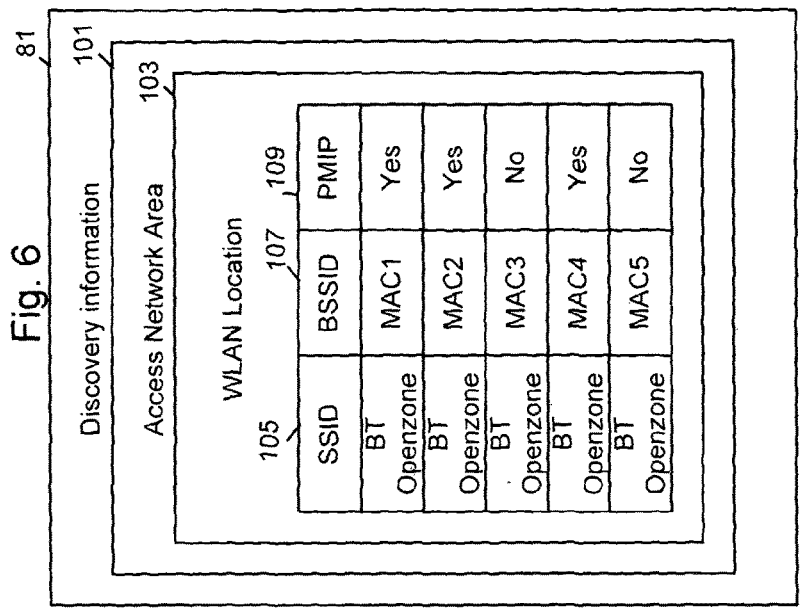
FIG. 6 shows the components of discovery information illustrated in FIG. 4.

FIG. 6 shows the contents of the discovery information 61 relevant to the first embodiment. The Discovery information 61 contains Access Network Area information 101 relating to the properties of the various access networks for a given area such as 3GPP networks, Wi-Fi networks and any others like WiMax. In the section relating to WLAN networks 103, the discovery information 81 stores properties of each Wi-Fi access point 23 including an entry for an advertised Service Set Identifier (SSID) 105, and entry for a Basic Service Set Identifier (BSSID) 107 and additionally a further entry for a PMIP capability field 109 to enable the PMIP detection in accordance with the first embodiment.

Within the hotspot network 13, all of the access points 19 are configured to have the same SSID of "BT Openzone". However as mentioned above, within the network there can be hardware differences and therefore there is a need to identify each individual access point 19 in the Wi-Fi access network 13. The BSSID 107 entry for each access point 19 remains unique since this is typically set as the MAC layer address of the access point so the devices can be identified. The PMIP capability entry 109 indicates whether the access point 19 has the necessary configuration to support PMIP.

Finally, in order to update the information in the MO document 75, update information received at the network interface 71 is passed to the policy discovery information updater 77 which processes the update information and updates the MO document 75 with any additions or deletions contained in the update information. Updates would typically be received from the operator of the Wi-Fi access network 13 as and when the device configuration changes.

ANDSF allows operators to effectively dynamically modify the SSID preference list to be applied by the mobile device 3 when choosing between the access points 19 which are in range. Once connected to an access point 19 intersystem routing policies allow the mobile device 3 to control how traffic should be routed via the Wi-Fi and cellular connections 13, 15.

Operation

The processing of the virtual bonding interface 61 of the mobile device 3 in selecting one of the observed access points 19 will now be described with reference to FIG. 7.

In step s1, the mobile device 3 performs a Wi-Fi scan to determine whether there are any access points 19 in the surrounding area. In this embodiment, the mobile device 3 performs both conventional methods of access point detection. Namely, passively listening for standard 802.11 beacon frames from surrounding access points, and also actively probing for access points by transmitting wildcard probe requests on each Wi-Fi channel and waiting for access points to respond. The results of the scan, i.e. a list detected access points are stored in the access points store 67 in step s3. In the example system in FIG. 1, there are three detected access point 19a, 19b and 19c.

In step s5, the virtual bonding interface 61 performs a test to determine whether PMIP is actually required based on the current requirements of existing data sessions as indicated in session store 69. If it is determined that PMIP is not required, then in step s7 the virtual bonding interface 61 selects the access point 19 having the greatest signal strength and processing proceeds to step s9 in which the virtual bonding interface 61 authenticates and associates with the selected access point 19 in the conventional manner.

The test in step s5 is included because PMIP connections are computationally expensive and PMIP state data must be stored within the mobile device 3 and EPC network 11. If this extra processing is not required then a simpler connection can be utilised.

Figure 8:
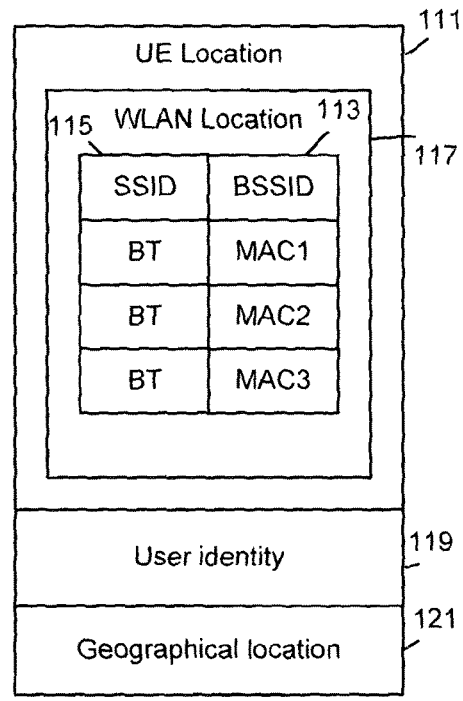
FIG. 8 shows a message sent from the mobile device to the ANDSF server.

However, if in step s5 it is determined that PMIP is required, in step s11, the virtual bonding interface 61 sends a message to the ANOSF server 31 in the EPC 11 via the LTE radio access network 15. FIG. 8 shows an example message which is a populated ANDSF management object 111 containing details of the detected access points 113, including the SSID 115 and BSSID 117, the user's identity 119 and the mobile device's location 121. The virtual bonding interface 61 then waits for a reply from the ANDSF server 31.

Figure 9:
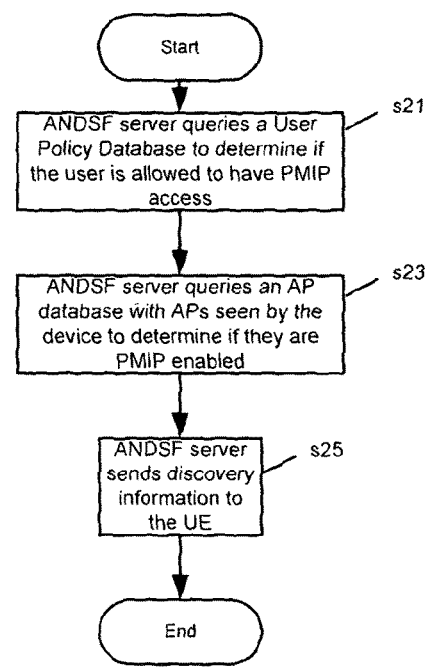
FIG. 9 is flowchart showing the operation of the ANSDF server.

The processing of the ANDSF server 31 will be described with reference to the flowchart shown in FIG. 9.

When an ANDSF MO request is received at the network interface, in step s21 the request processor 73 uses the user identity information 119 as input to query the user policy 93 and the HSS 23 in the EPC 11 to determine whether the user is allowed to have PMIP access.

Next, in step s23 the request processor 73 uses the mobile device's location 121 and the observed access point information 113 in the received request message to query the WLAN location information 103 to determine whether those detected access points 19 and any others in the area are PMIP enabled.

Figure 10:
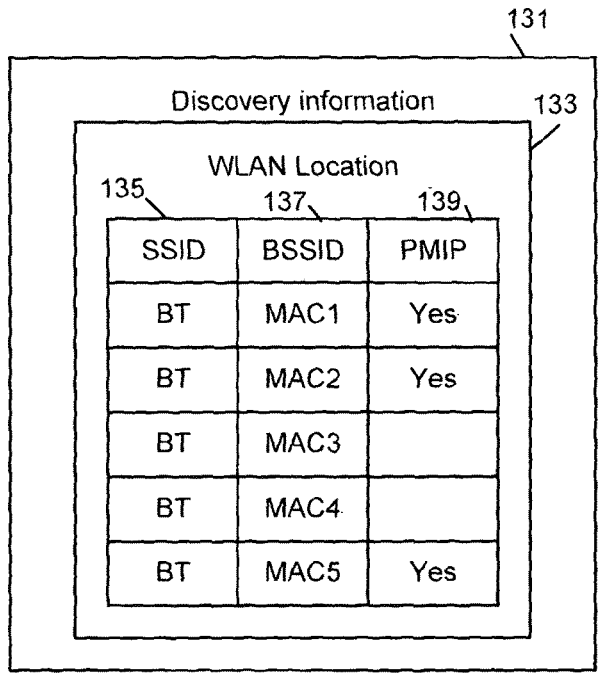
FIG. 10 shows a message format sent from the ANDSF server.

In step s25, the request processor 73 then sends the results back to the virtual bonding interface 61 and processing ends. FIG. 10 shows an example message of the discovery information message 131 sent by the request processor 73. The message 131 contains details of any access points in the area of the mobile device 3 and includes fields for the SSID 135, BSSID 137 and PMIP capability 139. In FIG. 10, there are the three access points detected during the virtual bonding interface's 61 scan and also two further access points 19 which are in the same location as the mobile device 3 but were not detected in the scan.

Figure 7:
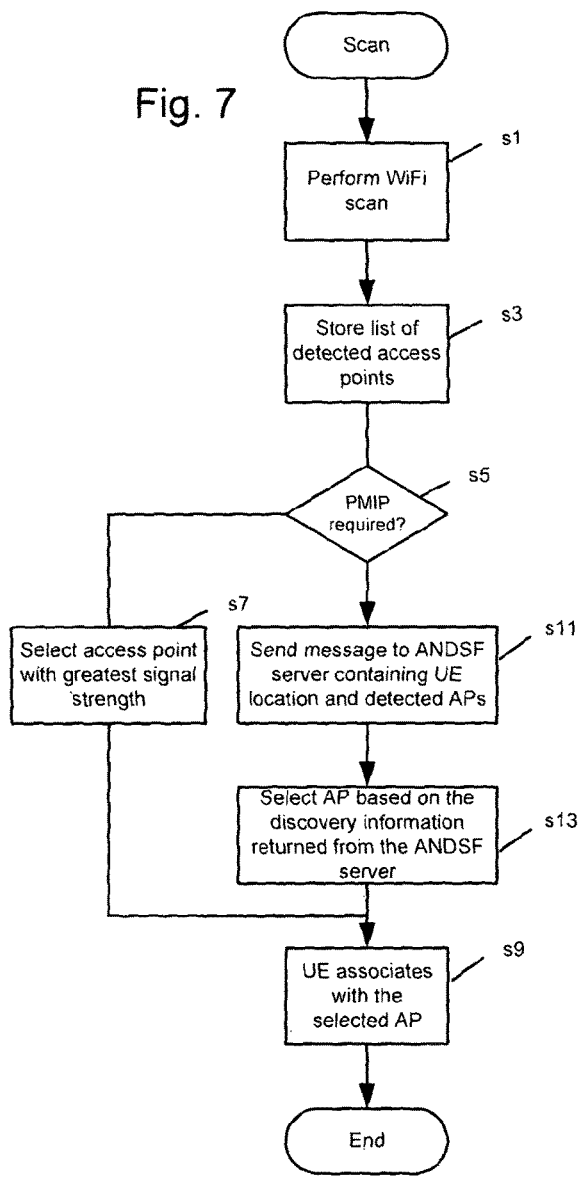
FIG. 7 is a flowchart showing the operation of the virtual bonding interface of the mobile device.

Returning to the processing of the virtual bonding interface 61 in FIG. 7, when the virtual bonding interface 61 receives an ANDSF management response message 131 from the ANDSF server 31, in step s13 the virtual bonding interface 61 selects one of the access points 19. The selection is based on which of the available access points 19 is capable of offering PMIP support and the signal strength to each access point 19.

Processing then proceeds to step s9, where the virtual bonding interface 61 performs the standard Wi-Fi association and authentication operations with the selected PMIP enabled access point 19.

Once this processing is complete, the virtual bonding interface 61 of the mobile device 3 can request flow mobility from the previous cellular access point 17 so that packet flows can be seamlessly directed to the virtual bonding interface 61 without interruption.

In this embodiment, the processing of the virtual bonding interface 61 enables the new MAG 25 to contact the LMA to perform the handing over of data sessions from the previous MAG 25 or S-GW 27.

The advantage of using ANDSF in the first embodiment is that no changes are necessary to the access points, MAGs or LMAs to be able to indicate support for PMIP within a particular access point. This is because the mobile device can query the ANDSF server using an alternate access network to select and attach to a particular access point. Furthermore the ANDSF server contains information relating to whether particular users have permission to use PMIP so that distinctions between groups of users can be made.

2$^{nd}$ Embodiment

In the second embodiment, rather than requesting information from an ANDSF server located within the cellular access network, the mobile device can request information directly from the detected access points to determine whether they are PMIP enabled.

Figure 11:
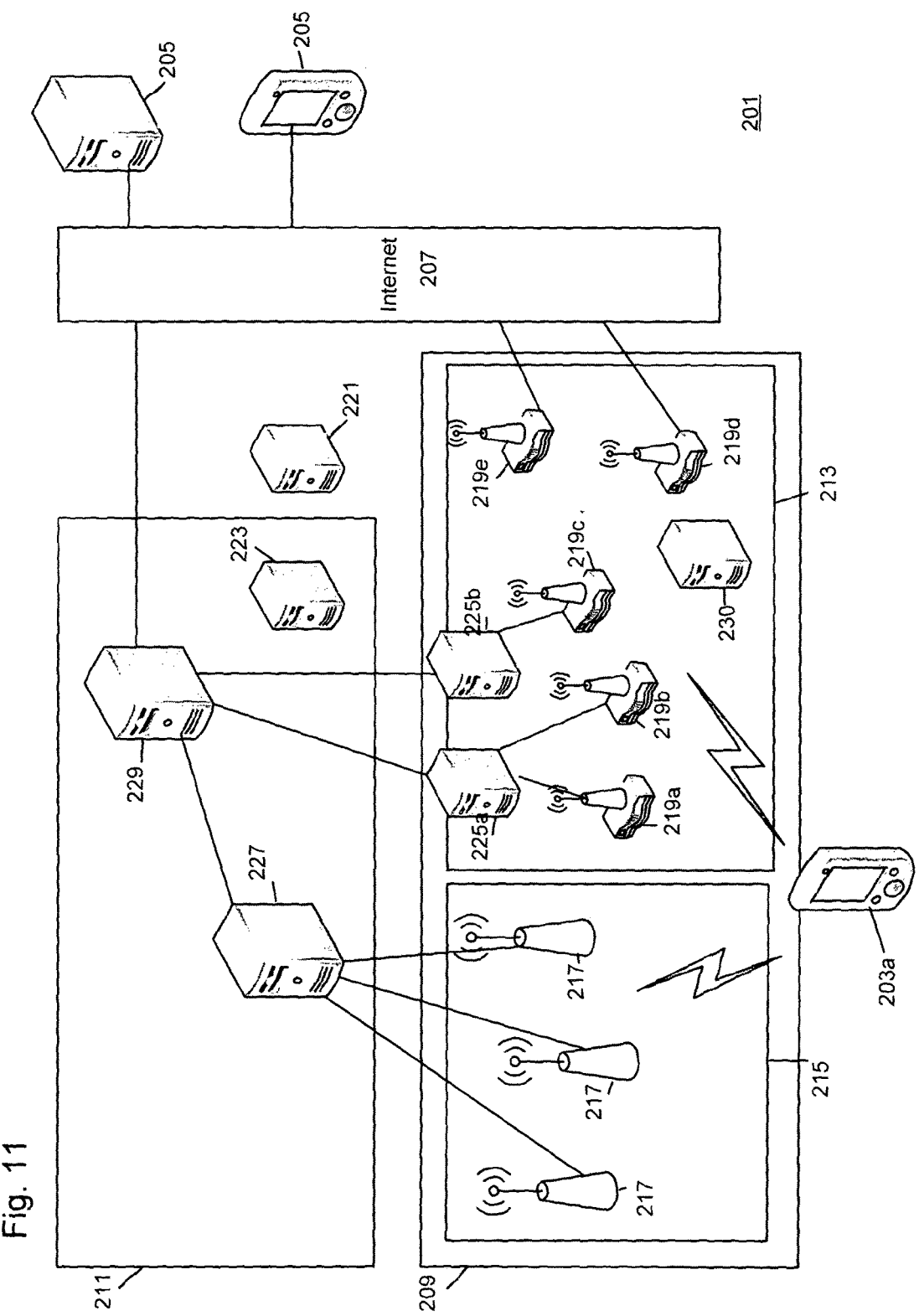
FIG. 11 shows an overview of a system architecture enabling mobile devices to determine mobile IP capability of access points according to a second embodiment.

FIG. 11 shows the network 201 in the second embodiment. The remote servers 205, Internet 207, Evolved Packet Core 211, LTE radio access network 215, MAGs 225, HSS 223 and AAA server have similar functionality to the remote servers 5, Internet 7, Evolved Packet Core 11 and LTE radio access network 15, MAGs 25, HSS 23 and AAA server 21 in the first embodiment and will not be described again.

However the processing within the mobile device 203 and the access points 219 are different from the mobile device 3 and access points 19 of the first embodiment. A user database 230 is also present to answer queries from access points 219 as will be described later.

In the second embodiment, the mobile device 203 can query the capabilities of surrounding access points 219 prior to association and authentication. This is achieved using the IEEE802.11u Generic Advertising Service (GAS) and specifically Access Network Query Protocol (ANQP) queries. IEEE 802.11u is an amendment to the original 802.11 protocol to add features that improve internetworking with external networks. The Access Network Query Protocol (ANQP) is a part of this service.

The physical components of the mobile device 203 are the same as in the first embodiment, however the software instructions in memory are different and cause the functional behaviour of the mobile device 203 to be different.

Figure 12:
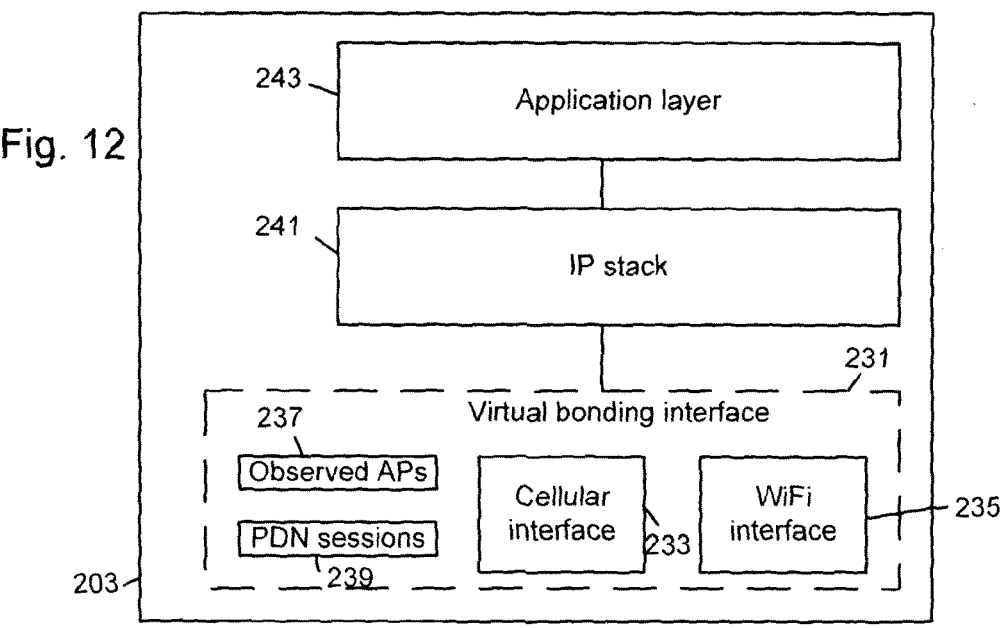
FIG. 12 schematically shows the functional components of a mobile device in the second embodiment.

FIG. 12 shows the functional components of a mobile device 203 in the second embodiment. The mobile device 203 contains a virtual bonding interface 231 connected to an IP layer 241 and applications 243. The virtual bonding interface 231 encapsulates a cellular interface 233 and a Wi-Fi interface 235 as in the first embodiment and also contains a list of observed access points 237 and a list of current data sessions over the cellular interface 233.

Figure 13:
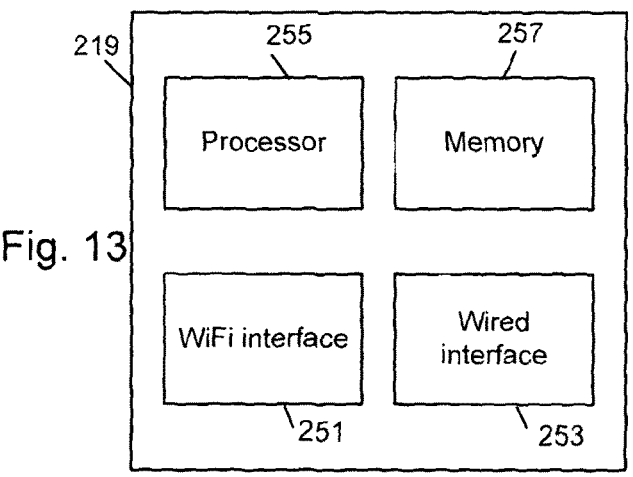
FIG. 13 shows the physical components of an access point illustrated in FIG. 11.

FIG. 13 shows the physical components of the access point 219. The access point 219 contains a Wi-Fi interface 251, a wired interface 253, a processor 255 and a, memory 257. When software stored in the memory 253 is executed on processor 255 a number of functional components are created.

Figure 14:
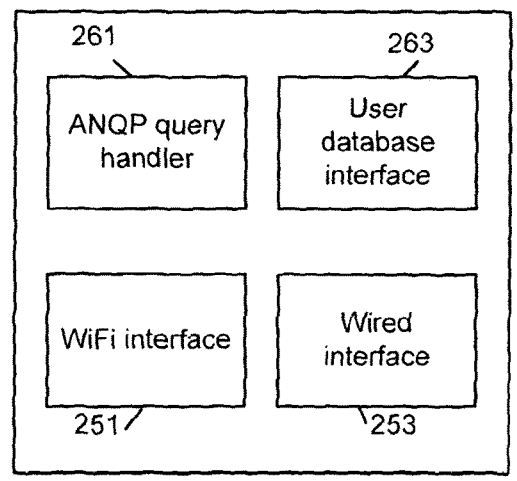
FIG. 14 shows the functional components of the access point of FIG. 13.
Figure 15:
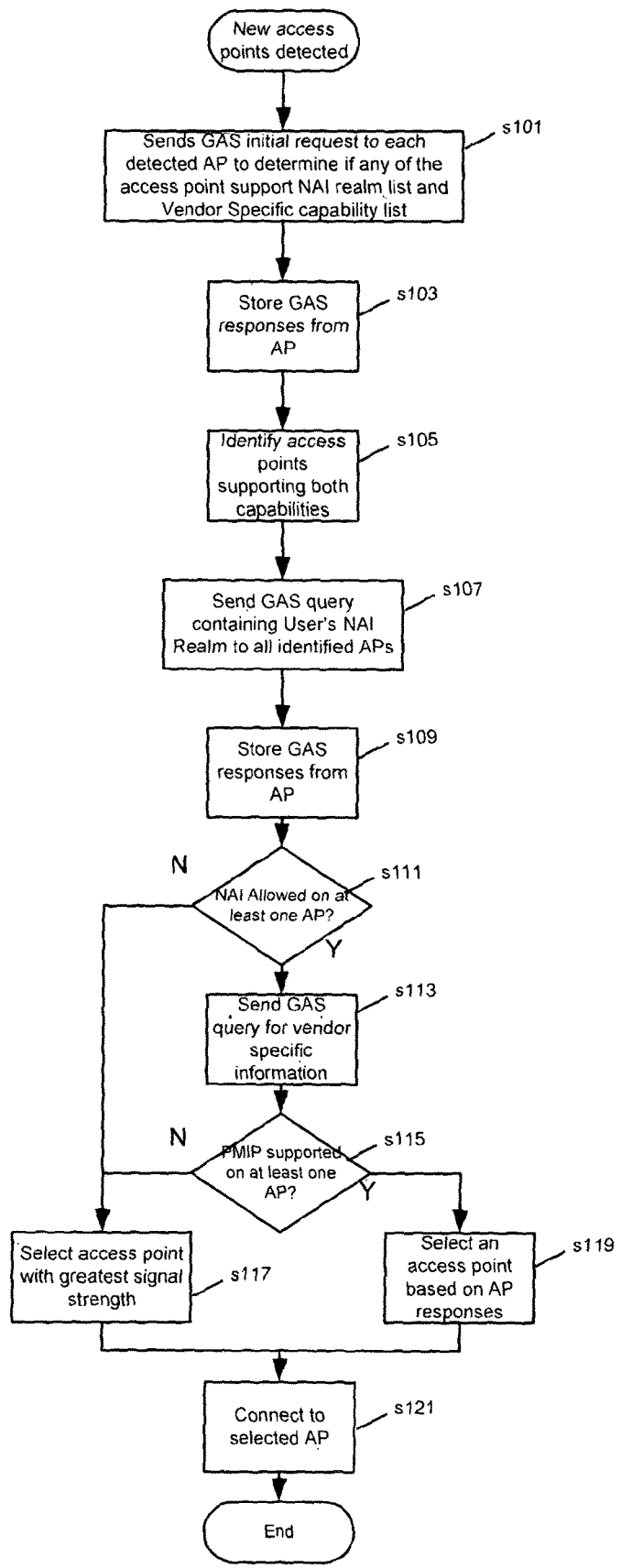
FIG. 15 is a flowchart showing the operation of the mobile device in the second embodiment.

FIG. 14 shows the functional components of the access point 219 in the second embodiment which includes the Wi-Fi interface 251 and the wired interface 253. An ANQP query handler 261 processes requests for information from mobile devices 219 and generates appropriate responses. A user database interface 263 communicates with the user database 230 in response to mobile device 203 ANQP requests.

In accordance with the 802.11 standard, to indicate support for 802.11u, the access point 219 issues beacon frames including an Internetworking Information Element which can be interpreted by listening mobile devices 3. Additionally, the Internetworking Information Element can be returned to any Probe Requests issued by an actively scanning mobile device 203.

Once a mobile device 203 has received and identified the Internetworking Information element indicating support for 802.11u in the access point 219, then the device can query the access point 219 capabilities prior to associations. Rather than requesting the complete set of access point capabilities at once, the mobile devices 203 send requests for general capabilities initially and in response to the information received, request increasingly detailed capability information.

The processing of the mobile device 203 and each of the detected access points 219 in the second embodiment will now be described with reference to the flowchart in FIG. 16.

When the mobile device has detected access points having the internetworking Information Element and stored the list in access point store 237, the mobile device 203 sends a GAS query to each in range Access Point to determine whether it supports the ANQP capabilities NAI Realm List and Vendor Specific using an ANQP QueryList message.

In step s103 the access point responds in the form of ANQP CapabilityList messages are stored in the access point store 237. In step s105 the access points indicating support for both the Vendor Specific and NAI Realm List capabilities are identified. In step s107, the mobile device 203 then sends another GAS query to the identified access points to determine whether its Network Access Identifier (NAI) Realm is allowed on the identified AP, i.e. whether the mobile device is authorised to be a device on the BT Openzone network 213. In step s109 the responses from the access points 219 are stored in the access point store 237.

In step s111 the responses are checked to determine whether at least one of the access points 219 have responded with a ANQP NAI Realm capability message indicating that the mobile devices NAI is one of the supported realms. If the test indicated that the NAI was not supported then processing proceeds to step s117 where the access point with the strongest signal is selected and in step s121 the mobile device connects to the access point 219. In this case it was not able to detect PMIP capability and so the mobile device connected without enabling PMIP.

However if in step s111 at least one access point 219 did respond that the mobile device's 3 NAI realm was allowed, the in steps s113 the mobile device 3 requests the vendor specific capability value supplying an ANQP vendor specific capability element with the OI set to BT's OI.

The processing of the access point 219 on receiving this request will now be described.

The access point 219 forwards to the User Database Server 230, the MAC Address of the requesting device 203 and the previously received NAI realm query from the device 203. The user database server 230 combines the sending access point ID, user mac address, NAI realm to determine whether the user/device 203 is enabled for PMIP/IFOM, the user database 230 may also query the MAG225 associated with the supplied realm to determine if they have sufficient capacity. Based on this information the user database 230 sends a response indicating whether PMIP and IFOM would be available for that realm on this access point 219, The access point 219 constructs a GAS Initial Response message containing the ANQP Vendor Specific Capability element which includes a proprietary 1 octet bit field indicating PMIP (bit0) and IFOM (bit1) support for the realm.

Returning to FIG. 17, the mobile device 3 parses the responses to determine whether PMIP/IFOM is enabled for at least one access point 219. If there are none then processing proceeds to step s117 where the access point with the strongest signal is selected and connection occurs without PMIP support.

Alternatively, if at least one access point does support PMIP, then in step s119 the virtual bonding interface 231 selects an access point based on PMIP ability and signal strength and in step s121 the mobile device connects to the selected access point.

In the second embodiment, the mobile devices can determine during Wi-Fi Offload whether any of the surrounding access points can provide PMIP capability prior to the Wi-Fi association and authentication operations. This is achieved by a modification in the access points to support attributes of the 802.11u GAS/ANQP protocols.

Third Embodiment

In the first and second embodiments, the mobile devices can determine whether access points support PMIP prior to the standard association and authentication procedures. In the third and fourth embodiments, methods of post connection PMIP detection are described.

In the third embodiment, PMIP support is indicated by way of Router Advertising Messages.

Figure 16:
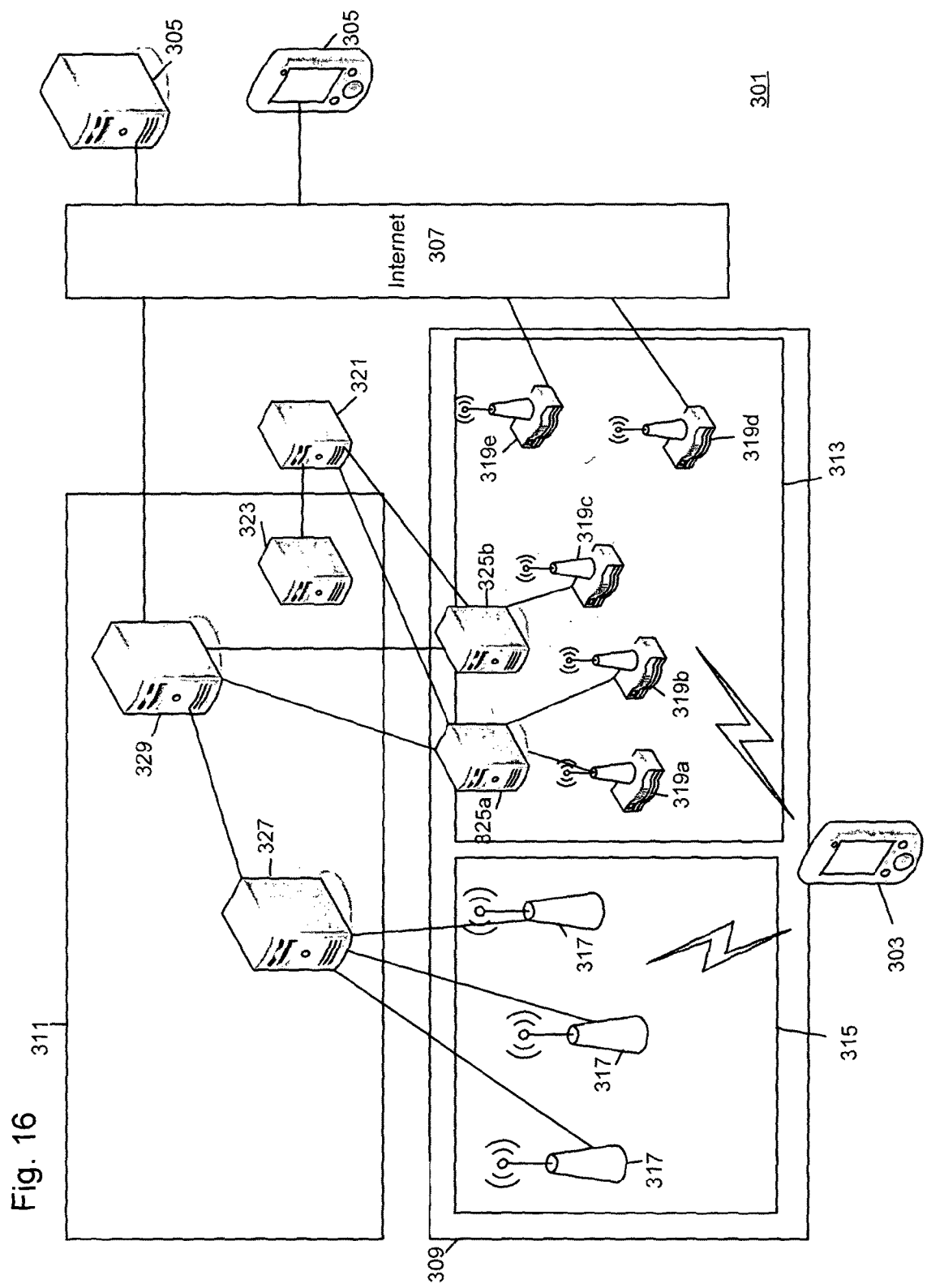
FIG. 16 shows an overview of a system architecture enabling mobile devices to determine mobile IP capability of access points according to a third embodiment.

FIG. 16 shows the network 301 in the third embodiment. The remote servers 305, Internet 307, Evolved Packet Core 311, LTE radio access network 315, MAGs 325, HSS 323 and AAA server 321 have similar functionality to the remote servers 5, Internet 7, Evolved Packet Core 11 and LTE radio access network 15, MAGs 25, HSS 23 and MA server 21 in the first embodiment and will not be described again.

However the processing within the mobile device 303 and the access points 319 are different from the mobile device 3, 213 and access points 19, 219 of the first and second embodiments. As in the second embodiment, a user database 330 is also present to answer queries from access points 319 as will be described later.

Unlike the previous embodiments, in the third embodiment, the mobile device 303 cannot obtain knowledge on whether an access point 319 supports PMIP, IFOM or any other network-based mobility before it has attached to that access point 319.

Figure 17:
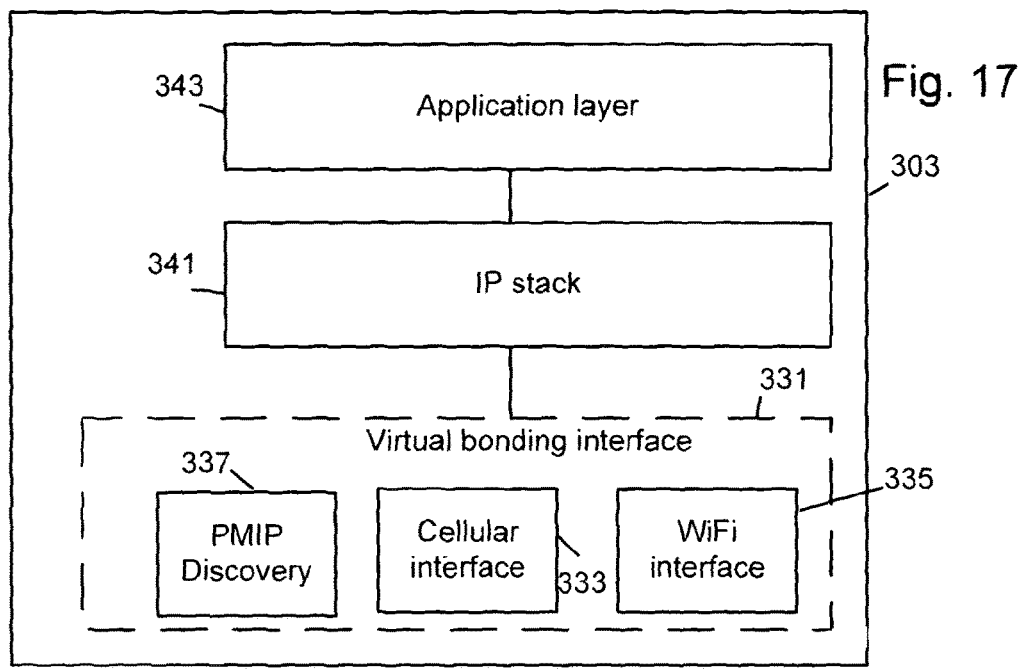
FIG. 17 schematically shows the functional components of a mobile device in the third embodiment.

FIG. 17 shows the functional components of a mobile device 303 in the third embodiment. The mobile device 303 contains a virtual bonding interface 331 connected to an IP layer 341 and applications 343. The virtual bonding interface 331 encapsulates a cellular interface 333 and a Wi-Fi interface 335 as in the first and second embodiments and also contains PMIP discovery component 337.

In this embodiment, the mobile device 303 scans for surrounding access points and selects an access point from the scan results based on the highest observed signal strength.

Once the access point 303 has been selected, the mobile device 303 initiates an association and authentication routine. The subsequent operation to determine PMIP at the access point will now be described with reference to FIG. 18.

In step s210 the mobile device 303 initiates an association and authentication with the access point 319.

Figure 18:
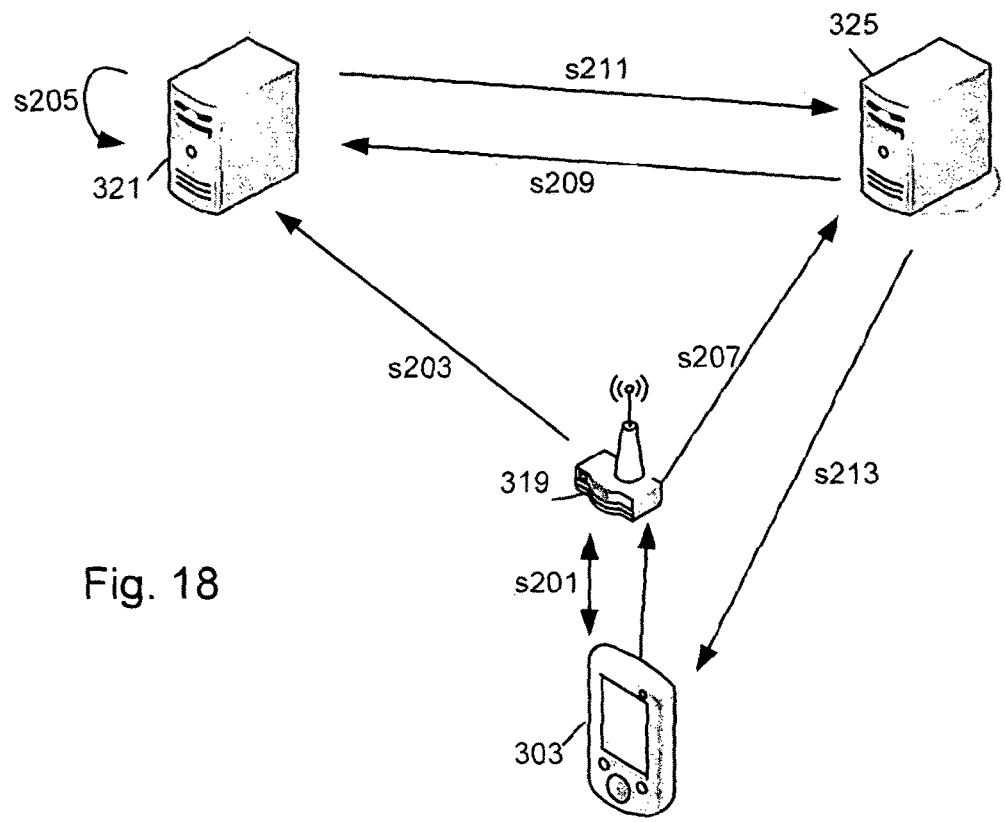
FIG. 18 shows the overall processing of the components in the third embodiment.
Figure 23:
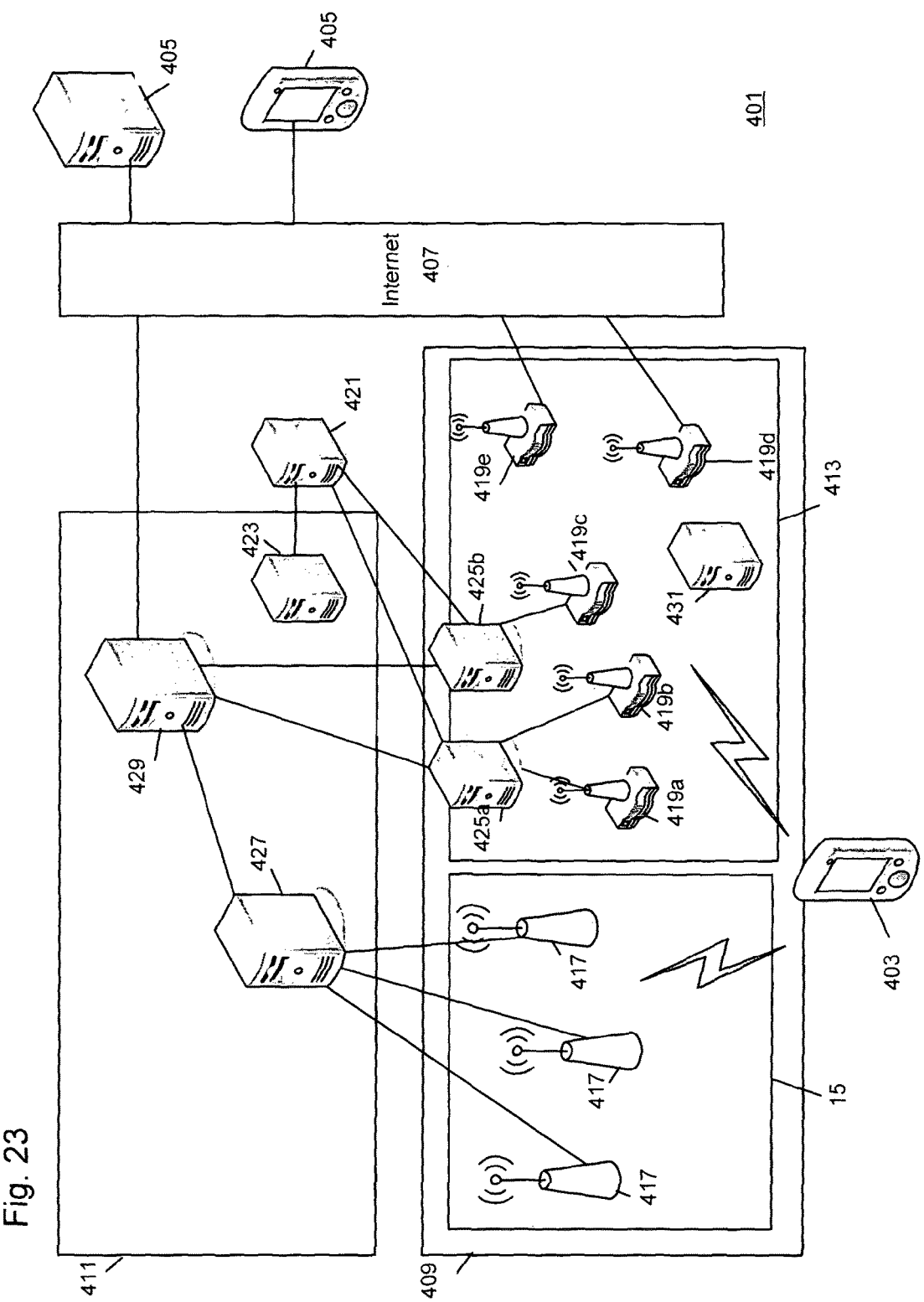
FIG. 23 shows an overview of a system architecture enabling mobile devices to determine mobile IP capability of access points according to a fourth embodiment.

FIG. 18 shows the functional components of an access point 319. The access point 319 includes a Wi-Fi network interface 351, a wired network interface 353, a user database interface 355 and an 802.1x authenticator 357.

When an association and authentication request is received on the Wi-Fi interface 351 from a mobile device 303, the request is processed by the 802.1x authenticator. In addition to the standard information, in step s203 the access point 319 forwards the Wi-Fi device's MAC address in the IEEE 802.1x authentication exchange to the WLAN AAA server 321 via the wired interface 353.

FIG. 19 shows the functional components of the WLAN AAA server 321. The WLAN AAA server 321 contains an access point interface 361, a user database 363, an external database interface 365 and a MAG interface.

When an authentication notification message is received at the access point interface 361 from a access point 319, in addition to the standard authentication steps, including contacting the HSS 323 via the external database interface 365, in step s305, the WLAN AAA server 321 updates the user database 363 to store the mobile device's 303 MAC address. After authentication, the WLAN AAA 321 will know the MAC address for the user of the mobile device 303 and the per-user policy for PMIP IFOM is either pre-configured in the WLAN AAA server 321 on either a per user or per NM realm basis. Additionally, in cases where the WLAN MA server is a proxy for another AAA server, the PMIP information is retrieved as a Radius Attribute value pair from a Home AAA server (not shown).

Once IEEE802.1x authentication has completed successfully, in step s207, the mobile device 303 sends a router solicitation message via the PMIP discovery 337 to the MAG 325. The MAG 325 is the first hop access router for the mobile device 303 connected to a PMIP enabled access point 319. On receipt of the router solicitation message, in step s209 the MAG 325 uses the source MAC address of the router solicitation to query the WLAN AAA server as to whether PMIP and/or IFOM are enabled for the user of the mobile device. The WLAN AAA server returns a result in step s211. If PMIP and/or IFOM are supported, then in step s213 the MAG includes the additional options indicating PMIP/IFOM support in the Router Advertisement message to the mobile device 303.

The PMIP flag in the router advertisement message are implemented either using an option as defined in RFC 2461 or a specific single-bit flag using RFC 5175 extension mechanism to allow for definition of additional single-bit flags in IPv6 router advertisement messages. An additional second flag could be used to indicate support for IP flow FIG. 21 shows the structure of a router advertisement message. The message has the following fields:
- a type field 371 which identifies the ICMPv6 message type; for Router Advertisement messages the value is 134.
- a code field 373 which is not used;
- a checksum field 375 which is a 16 bit checksum field for the ICMP header;
- a current hop limit field 377 which contains the default value the MAG is telling access points on the network to put in the hop limit of datagrams they send;
- an Autoconfig flags field 379 which tells the mobile device how auto-configuration is performed on the Wi-Fi network;
- a router lifetime field 381 which tells the mobile device how long the MAG should be used as a default router;
- a reachable time field 383 which tells the mobile device how long a neighbour should be considered to be reachable;
- a retransmission timer field 385 which tells the mobile device the amount of time a mobile device should wait before retransmitting certain messages; and
- an options field 387 which can contain the indication of PMIP and IFOM support.

FIG. 22 shows an option type within the options field 387 to indicate PMIP and IFOM support. The message contains a type field 389, a length field 391 and a value field which is split into a flag for PMIP 393 and IFOM 395.

The Router Advertisement 379 is intercepted by the virtual bonding interface 331 in the mobile device 303 which sits between the network interface cards 333, 335 and the IP stack 341 and so the virtual bonding interface sees all ICMP messages between the device IP stack 341 and the MAG 325. The virtual bonding interface 341 extracts the new ICMP Option field 387 to determine whether PMIP based session mobility 393 and for IP flow mobility 395 is supported on this access point 319.

If the PMIP flag 393 is set then the virtual bonding interface 331 will bond the Wi-Fi interface 335 into the same virtual interface as the current 3GPP network. However, if the PMIP bit 393 is not set then the Wi-Fi interface 335 will remain as an independent network interface. Therefore the mobile device may decide to disconnect from the current access point 319 and try a different access point which may support PMIP.

If the IFOM bits 395 are enabled then the virtual bonding interface will send uplink packets over the network interface card 333, 335 on which the last downlink packets for that IP flow was received. However, if the (FOM flag 395 is unset then outbound packets will be routed over the most preferred interface which would normally be the Wi-Fi interface 335.

Fourth Embodiment

In the fourth embodiment, the PMIP capability is determined using Dynamic Host Configuration Protocol (DHCP) v4 and allows PMIP capability to be determined on IPv4 networks.

FIG. 22 shows the network 401 in the fourth embodiment. The remote servers 405, Internet 407, Evolved Packet Core 411, LTE radio access network 415, MAGs 425, HSS 423 and AAA server 421 have similar functionality to the remote servers 305, Internet 307, Evolved Packet Core 311 and LTE radio access network 315, MAGs 325, HSS 323 and AAA server 321 in the third embodiment and will not be described again.

When a mobile device 403 has associated and authenticated on the hotspot network 413 via an access point 419, it sends a DHCP discovery request message to a DHCP server 431 to obtain an IPv4 address.

The DHCP offer sent from the DHCP server 431 will contain an indication of PMIP support, in this case a new standard defined option or a vendor specific extension.

In the third and fourth embodiments the determination of PMIP support is carried out during or after Wi-Fi association and authentication. Little change is required to the access points and there is minimal impact on the mobile device's Wi-Fi stack or support of extra standard and protocols.

Furthermore, the PMIP capability can be controlled dynamically. For example, if the MAG is running low on resources, then the advertisement of PMIP capability can be disabled.

Alternatives and Modifications

In the first embodiment, in the processing of the Connection Manager 60 causes a request to be issued to the ANDSF server. In an alternative, the ANDSF is more active and can send Wi-Fi access point information to the mobile device as soon as it joins and is detected on the hotspot network.

In a further alternative, the ANDSF server is arranged to send update messages to previously requesting devices as and when new devices are located on the hotspot network.

In the second embodiment, the mobile device sent the NAI realm request and the Vendor specific information request separately in steps s107 and step s113. In an alternative, the requests are combined into a single request.

In the third embodiment, the mobile device is configured to send a router solicitation message to the MAG. In an alternative, the router advert is initiated by the WLAN AAA server once it has updated its User Database 363.

In a further alternative, PMIP is not indicated in the option section 387 of a router advertisement but instead in a standardised Router Advertisement Flags option (type 26). Unallocated bits for each of PMIP and IFOM are used.

In the embodiments, the mobile devices detect for the presence of PMIP support in the access points. It will be clear to persons skilled in the art that the approaches of the four embodiments are applicable to other network mobility protocols such as GPRS Tunnelling Protocol (GTP).

The invention claimed is:

1. A method of determining whether wireless local area network (WLAN) access points of a WLAN hotspot network are capable of providing a network mobility service to data sessions of a wireless communication device, each WLAN access point configured with the same Subscriber Service Identity (SSID) network name and at least a first set of WLAN access points being capable of supporting the network mobility service and at least a second set of WLAN access points being unable to support the network mobility service, and the wireless communication device having a cellular network interface and a wireless local area network network interface, and being connected to the cellular network, the method comprising:
   detecting, using the wireless local area, network interface, any WLAN access points of the WLAN hotspot network which are within a wireless local area network connectivity range of said wireless communication device;
   sending to a network device directory server, via the cellular network, a request for access point handover candidates, the request including a list of the detected WLAN access points and user identity information;
   receiving a response from the network device directory server via the cellular network interface, containing the list of detected WLAN access points and for each detected WLAN access point, an indication of whether that WLAN access point can provide the network mobility service determined on the basis of that WLAN access point being in the first set of WLAN access points of the hotspot network, and a determination that a user of the wireless communication device, as identified by the user identity information, is permitted to access the network mobility service;

processing the received response in order to select a handover WLAN access point; and connecting to the selected WLAN access point of the WLAN hotspot network, wherein said sending the request, said receiving the response, and said processing the received response is performed prior to said connecting to the selected WLAN access point.

2. The method according to claim 1, wherein:
the request includes the location of the wireless communications device; and
the response includes for the identity of at least one of the WLAN access points which was not detected by the wireless communication device but is in the same location as the wireless communications device.

3. The method according to claim 1, wherein the network device directory server is an Access Network Discovery & Selection Function server located in the cellular network.

4. An apparatus wireless communications with a cellular network and a wireless local area network (WLAN) hotspot network, the WLAN hotspot network being formed of a plurality of WLAN access points, each configured with the same Subscriber Service Identifier (SSID) and at least a first set of WLAN access points being capable of supporting a network mobility service and at least a second set of WLAN access points being unable to support the network mobility service, the apparatus comprising:

a cellular network interface;
a WLAN interface;
a processing system, including a processor and memory storing instructions for execution by the processor, the processing system being configured to:
detect, using the WLAN interface, any WLAN access points of the WLAN hotspot network which are within a wireless connectivity range;
send, via the cellular network, to a network device directory server, a list of the detected access points and user identity information;
receive a response from the network device directory server via the cellular network interface, containing the list of detected WLAN access points and for each detected WLAN access point, an indication of whether that WLAN access point can provide the network mobility service determined on the basis of that WLAN access point being in the first set of WLAN access points of the hotspot network, and a determination that a user of the wireless communication device, as identified by the user identity information, is permitted to access the network mobility service;
process the response in order to select a handover wireless access point; and
connect to the selected WLAN access point of the WLAN hotspot network,
wherein the processing system is configured to send the request, receive the response, and process the received response prior to connecting to the selected WLAN access point.

5. The apparatus according to claim 4, wherein:
the request includes the location of the wireless communications device; and
the response includes the identity of at least one of the access points which was not detected by the wireless communication device but is in the same location as the wireless communications device.

6. The apparatus according to claim 4, wherein the network device directory server is an Access Network Discovery & Selection Function server located in the cellular network.

7. A method of determining whether wireless local area network (WLAN) access points to a WLAN hotspot network are capable of providing a network mobility service to data sessions of a wireless communication device, each WLAN access point configured with the same Subscriber Service Identity (SSID) network name and at least a first set of WLAN access points being capable of supporting the network mobility service and at least a second set of WLAN access points being unable to support the network mobility service, and the wireless communication device having a cellular network interface and a WLAN interface and being connected to the cellular network, the method comprising:

the wireless communication device:
detecting, using the WLAN interface, any WLAN access points of the hotspot network which are within a wireless connectivity range;
sending, via the cellular network, a request to a network device directory server, the request including a list of the detected WLAN access points and user identity information,
the network device directory server:
receiving said request from said wireless communication device;
determining for each WLAN access point in the received list, whether that WLAN access point is in the first set of WLAN access points of the WLAN hotspot network, and whether a user of the wireless communication device, as identified by the user identity information, is permitted to access the network mobility service; and
sending a response message containing the list of detected WLAN access points and for each detected WLAN access point, an indication of whether that WLAN access point can provide the network mobility service to the user,
the wireless communication device:
receiving the response message from the network device directory server via the cellular network interface; and
processing the received device information to select a WLAN access point for handover prior to connecting to one of the detected WLAN access points.

8. A non-transitory computer-readable medium storing executable instructions for causing a computer system to perform a method of determining whether wireless local area network (WLAN) access points of a WLAN hotspot network are capable of providing a network mobility service to data sessions of a wireless communication device, each WLAN access point configured with the same Subscriber Service Identifier (SSID) network name and at least a first set of WLAN access points being capable of supporting the network mobility service and at least a second set of WLAN access points being unable to support the network mobility service, and the wireless communication device having a cellular network interface and a WLAN network interface and being connected to the cellular network, the method comprising:
- detecting, using the WLAN network interface, any WLAN access points of the WLAN hotspot network which are within a wireless connectivity range of said wireless communication device;
- sending to a network device directory server, via the cellular network, a request for access point handover candidates, the request including a list of the detected WLAN access points and user identity information;
- receiving a response from the network device directory server via the cellular wireless network interface, containing for each detected WLAN access point, an indication of whether that WLAN access point can provide the network mobility service determined on the basis of that WLAN access point being in the first set of WLAN access points of the hotspot network, and a determination that a user of the wireless communication device, as identified by the user identity information, is permitted to access the network mobility service;
- processing the received response in order to select a handover WLAN access point; and
- connecting to the selected WLAN access point of the WLAN hotspot network,
- wherein said sending the request, said receiving the response, and said processing the received device information is performed prior to said connecting to the WLAN access point.

9. The method according to claim 1, further comprising:
- performing a test to determine whether a network based mobility scheme is needed; and
- selecting the WLAN access point with a greatest signal strength for connection to the hotspot network if a determination is made that the network based mobility scheme is not needed; and
- performing said sending the request, said receiving the response, said processing the received device information, and said connecting to the selected WLAN access point if a determination is made that the network based mobility scheme is needed.

10. The apparatus according to claim 4, wherein the processing system s further configured to:
- perform a test to determine whether a network based mobility scheme is needed; and
- select the WLAN access point with a greatest signal strength for connection to the hotspot network if a determination is made that the network based mobility scheme is not needed; and
- perform said sending the request, said receiving the response, said processing the received device information, and said connecting to the selected WLAN access point if a determination is made that the network based mobility scheme is needed.

11. The method according to claim 7, further comprising, at the wireless communication device:
- performing a test to determine whether a network based mobility scheme is needed; and
- selecting the WLAN access point with a greatest signal strength for connection to the hotspot network if a determination is made that the network based mobility scheme is not needed; and
- performing said sending the request, said receiving the response, said processing the received device information, and said connecting to the selected WLAN access point if a determination is made that the network based mobility scheme is needed.

12. The non-transitory computer-readable medium according to claim 8, wherein the method further comprises:
- performing a test to determine whether a network based mobility scheme is needed; and
- selecting the WLAN access point with a greatest signal strength for connection to the hotspot network if a determination is made that the network based mobility scheme is not needed; and
- performing said sending the request, said receiving the response, said processing the received device information, and said connecting to the selected WLAN access point if a determination is made that the network based mobility scheme is needed.

* * * * *